United States Patent [19]

Ayabe

[11] Patent Number: 5,675,462
[45] Date of Patent: Oct. 7, 1997

[54] DISK USED FOR CALIBRATING FLOATING HEIGHT OF PROTRUSION DETECTION HEAD, METHOD OF CALIBRATING FLOATING HEIGHT OF PROTRUSION DETECTION HEAD USING THE DISK AND GLIDE TESTER USING THE METHOD

[75] Inventor: Sakae Ayabe, Isehara, Japan

[73] Assignee: Hitachi Electronics Engineering Co., Ltd., Tokyo, Japan

[21] Appl. No.: 521,447

[22] Filed: Aug. 30, 1995

[30] Foreign Application Priority Data

Sep. 2, 1994 [JP] Japan .................................. 6-234186

[51] Int. Cl.⁶ .................................................. G01B 21/08
[52] U.S. Cl. ...................... 360/135; 360/103; 428/694 TR
[58] Field of Search .......................... 360/75, 103, 135; 369/272, 280, 277; 428/694 SG, 694 TR

[56] References Cited

U.S. PATENT DOCUMENTS

| | | | |
|---|---|---|---|
| 4,828,895 | 5/1989 | Bickert et al. | 428/65 |
| 4,988,194 | 1/1991 | Hara et al. | 356/243 |
| 5,488,857 | 2/1996 | Homma et al. | 73/105 |
| 5,557,554 | 9/1996 | Kawaguchi et al. | 364/571.01 |

*Primary Examiner*—James P. Trammell
*Assistant Examiner*—Craig Steven Miller
*Attorney, Agent, or Firm*—Fay, Sharpe, Beall, Fagan, Minnich & McKee

[57] ABSTRACT

A bump disk including a standard protrusion having a predetermined height and a plurality of reference protrusions positioned either on substantially the same radial line as the standard protrusion or on a circumferential line having substantially the same radial distance as the standard protrusion under a predetermined positional relationship with respect to the standard protrusion, a method of calibrating the floating height of a protrusion detection head by making use of a standard circumferential speed determined with the bump disk and a glide tester using such calibration method.

13 Claims, 7 Drawing Sheets

FIG. 4A $r_1 \fallingdotseq r_2 \fallingdotseq r_3$ $r_S > r_1$ $r_S > r_2$ $r_S > r_3$

FIG. 4B

FIG. 5A $\delta h_S \fallingdotseq \delta h_1$
$\delta h_S \fallingdotseq \delta h_2$
$\delta h_S \fallingdotseq \delta h_3$
$r_S \fallingdotseq r_1$
$r_S \fallingdotseq r_2$
$r_S \fallingdotseq r_3$

FIG. 6B $\delta hs > \delta hp$

DISK USED FOR CALIBRATING FLOATING HEIGHT OF PROTRUSION DETECTION HEAD, METHOD OF CALIBRATING FLOATING HEIGHT OF PROTRUSION DETECTION HEAD USING THE DISK AND GLIDE TESTER USING THE METHOD

BACKGROUND OF THE INVENTION

1. Field of the Invention

The present invention relates to a disk used for calibrating the floating height of a protrusion detection head, a method of calibrating the floating height of the protrusion detection head using the disk and a glide tester using the method, and, more specifically, relates to a bump disk which permits easy identification of a standard protrusion on the bump disk used for calibrating the floating height of a protrusion detection head without necessitating reference to an index mark (hereinafter called as IND) on the bump disk during inspection of a protrusion on a magnetic disk through a glide tester, a method of calibrating the floating height of the protrusion detection head with the bump disk and a glide tester which automatically performs calibration of the floating height of the protrusion detection head.

2. Background Art

Magnetic disks which constitute one of information recording media are manufactured while using aluminium or glass disks as the base and applying a magnetic film on the respective surfaces thereof. The magnetic film surface is required to be formed into a smooth and flat surface with no unevennesses such as protrusions. For this purpose, the magnetic surface is burnished. However, even after the burnishing protrusions may remain. When there remain more than a predetermined number of protrusions having a height more than a predetermined one, these protrusions bump with a magnetic head and damage the same, and further are likely to cause errors in data to be accessed. For preventing these dangers a protrusion inspection for magnetic disk is performed with a protrusion inspection device, in particular, with a glide tester which serves as a protrusion inspection device as well as a burnishing device, and as the result of the protrusion inspection when it was found out that more than the predetermined number of protrusions having a height more than the predetermined one still remain, the magnetic disk was again burnished with a burnishing head.

A method of calibrating a protrusion detection head in a protrusion inspection device including such glide tester was filed by the same assignee as a U.S. patent application U.S. Ser. No. 08/222,948 with the title of "CALIBRATION METHOD FOR PROTRUSION DETECTING HEAD UNITS AND PROTRUSION INSPECTION METHOD AND PROTRUSION INSPECTION DEVICE USING THE SAME".

For the protrusion detecting head in a glide tester a piezo-electric element using quartz was first used, however the detection sensitivity and the saturation characteristic of the piezo-electric element are unsatisfactory, and further miniaturization thereof was difficult, therefore an ultrasonic piezo-electric sensor (hereinafter simply called as ultrasonic sensor) having excellent detection sensitivity and saturation characteristics now draws attention. The same assignee produced a protrusion detection head using such an ultrasonic sensor and filed a U.S. patent application U.S. Ser. No. 07/977,634 with the title of "PROTRUSION SENSOR FOR SENSING PROTRUSION ON A DISC".

FIG. 7 shows a fundamental constitution of a protrusion inspection system in a glide tester. For the protrusion inspection with the glide tester a magnetic disk 1 which is an object for the inspection is, for example manually, mounted on a spindle 21 in a rotating mechanism 2. Then, a carriage mechanism 4 is moved through control of a carriage control circuit 5a in a control circuit 5 and a protrusion detection head 3 is loaded on the magnetic disk 1. At the loading position the rotation of a motor (M) 22 is controlled by a circumferential speed control circuit 5b in the control circuit 5 to rotate the magnetic disk 1 at a predetermined circumferential speed. Via the rotation at the predetermined circumferential speed of the magnetic disk 1 air flow is caused on the surface of the magnetic disk 1 and the protrusion detection head 3 is lifted by a predetermined standard height $\delta hs$. When the height of a protrusion T existing on the magnetic disk 1 is higher than the predetermined standard height $\delta hs$, the detection head bumps to the protrusion T to vibrate an ultrasonic wave sensor $3a$ provided at a supporting arm in the carriage mechanism 4 and, after removing noises by a protrusion detection circuit 6, the output signals from the ultrasonic wave sensor $3a$ are outputted as protrusion detection signals. The protrusion detection signals are inputted into a MPU $7a$ in a data processing unit 7 wherein protrusion data including position and number of the detected protrusions are prepared and are displayed on a display $7c$.

Numeral $7b$ is a memory provided in the data processing unit 7 in which several types of programs are stored such as a protrusion detection program $7b$ and a circumferential speed control program required for protrusion detection executed by the MPU $7a$. Further, numeral 23 is an index detection circuit provided in the motor 22.

In the course of the protrusion inspection with the thus constituted device, it is necessary that the protrusion detection head 3 is always lifted at the predetermined standard height $\delta hs$. In this instance the floating height varies depending on the circumferential speeds of the magnetic disk 1. Therefore, the relationship of circumferential speeds with respect to the standard height $\delta hs$ is determined in advance. Herein the predetermined circumferential speed which causes the standard height $\delta hs$ is called a standard circumferential speed Vs.

The protrusion detection head 3 may often be damaged through bumping into protrusions T. When a protrusion detection head is damaged, the damaged protrusion detection head has to be replaced by a new one. Since respective protrusion detection heads show variations with regard to their configurations, weights and supporting springs, they are not necessarily lifted at an equal floating height even with a same circumferential speed. Therefore, it is necessary for the respective protrusion detection head 3 which are newly installed to be calibrated in their floating height at a correct height. The calibration is performed by determining the standard circumferential speed Vs with respect to the standard height $\delta hs$. For this purpose, a disk called a bump disk and used for calibrating the floating height in order to be used in place of the magnetic disk 1.

FIG. 8 shows an example of currently used bump disks 8. The bump disk 8 is provided with an index mark (IND), which is used for positioning in the angular direction, and a standard protrusion Ts for calibration use having a standard height $\delta hs$ at a coordinate position of angle $\theta s$ with respect to the IND and radial distance $r_s$ from the center O. Further, the spindle 21 is also provided with an IND of which position is detected by an index detection circuit 23.

During the floating height calibration the bump disk 8 is mounted on the spindle 21 while manually registering the IND on the bump disk 8 with the IND on the spindle 21 as shown. Then the spindle 21 is rotated and the MPU 7a, after accessing data stored in the memory 7b or in response to data input from an external device, outputs a control signal which positions the protrusion detection head 3 on a track having the radial distance $r_s$ representing the standard protrusion Ts. The control signal is then fed to the control circuit 5 to move the carriage mechanism 4 and the protrusion detection head 3 is stopped at the position having radial distance $r_s$. At this position, when the circumferential speed of the bump disk 8 is gradually reduced, the floating height of the protrusion detection head 3 is also gradually reduced. At the circumferential speed Vs at the track position having the radial distance $r_s$, the protrusion detection head 3 bumps to the standard protrusion Ts. The bumping is detected by the ultrasonic wave sensor 3a and the circumferential speed at this moment is determined as the standard circumferential speed Vs for the instant protrusion detection head 3. Through these operations the floating height of the protrusion detection head 3 is calibrated at a correct value.

In the above case, since the standard protrusion Ts is very small, the standard protrusion Ts can be mixed up with dust deposited on the bump disk 1. Therefore, in order to a certain the detection accuracy the rotation angle θ of the spindle 21 is detected by an angle detector (not shown) and the MPU 7a checks whether the detected rotation angle meets with the angle θs of the standard protrusion Ts with reference to the detection signal from the ultrasonic wave sensor 3a. Through this operation, the standard protrusion Ts is a certained. The angle θs can be determined, not by the angle detector, as a rotation amount from an index detection signal (IND signal) of the spindle 21 which is obtained from the index detection circuit 23.

These days, the mounting and exchanging of the magnetic disk 1 and of the bump disk 8 for the spindle 21 are performed automatically through the provision of a handling mechanism.

FIG. 9 is a schematic explanatory view of a handling portion in the handling mechanism 9. The handling portion includes a rotatable portion 91 and two hands 92a and 92b provided at the both sides thereof. For example, the hand 92a holds the end portion of the bump disk 8 via a suction chuck of the hand 92a, and moves down from the upper portion of the spindle 21 so as to mount the bump disk 8 onto the spindle 21, then after completing the calibration the bump disk 8 is again held at the end thereof via the suction chuck and moved upward to disengage from the spindle 21. Under this condition the rotatable portion 91 rotates by 180° to displace the magnetic disk 1 held via a suction chuck of the band 92b above the spindle 21, and then moves down to mount the magnetic disk 1 onto the spindle 21.

When performing the automatic mounting of the disks with such handling mechanism 9, the bump disk 8 can be mounted onto the spindle 21 without being registered the both INDs on the bump disk 8 and the spindle 21. If the both INDs are not registered whether the identification with reference to the angle θs of the standard protrusion Ts is proper can not be acertained. Moreover, the coordinate value of angle θs and radial distance $r_s$ does not necessarily show a desirable accuracy for the very small standard protrusion Ts. Therefore, the protrusion detection head 3 is stopped at the position of the standard protrusion Ts relying on the radial distance $r_s$ and then the calibration is performed. However, the ascertaining whether the identification only with reference to the radial distance $r_s$ of the standard protrusion Ts is proper is difficult because of a possible deposition of foreign matters such as dust on the bump disk 8, therefore there arises a problem that dust can be misidentified as the standard protrusion.

In order to avoid the above problem in the course of the automatic mounting of the disks, it is possible to provide an IND detection mechanism for the bump disk and to mount the bump disk onto the spindle so as to register the IND of the bump disk with the IND of the spindle via the control of the handling mechanism. However, with this measure additional mechanisms increase and complex and highly accurate controls are required.

SUMMARY OF THE INVENTION

An object of the present invention is to resolve the problems of the conventional art and to provide a disk used for calibrating the floating height of a protrusion detection head which permits the easy identification of a standard protrusion on a bump disk without necessitating reference to an IND on the bump disk.

Another object of the present invention is to provide a method of calibrating the floating height of a protrusion detection head in which through the use of the above calibration use disk (bump disk) the standard protrusion is identified without referring to the IND of the bump disk and based on the identification the floating height of the protrusion, the detection head is calibrated.

Still another object of the present invention is to provide a glide tester which performs an automatic calibration of the floating height of a protrusion detection head by making use of the above calibration use bump disk without referring to the IND of the bump disk and which performs protrusion detection of a magnetic disk.

The calibration use bump disk of the floating height of a protrusion detection head according to the present invention includes a standard protrusion having a predetermined height and a plurality of reference protrusions positioned either on substantially the same radial line as the standard protrusion or on a circumferential line having substantially the same radial distance as the standard protrusion under a predetermined positional relationship with respect to the standard protrusion.

Further, the method of calibrating the floating height of a protrusion detection head for a magnetic disk according to the present invention which makes use of a calibration use bump disk for calibrating the floating height of a protrusion detection head. A standard protrusion having a predetermined height and a plurality of reference protrusions positioned either on substantially the same radial line as the standard protrusion or on a circumferential line having substantially the same radial distance as the standard protrusion under a predetermined positional relationship with respect to the standard protrusion are used. A spindle is provided on which either the bump disk or the magnetic disk is selectively mounted. The method of the invention comprises a standard protrusion identification step in which the protrusion detection head is loaded over the bump disk mounted on the spindle, through the rotation of the spindle the protrusion detection head is lifted, the protrusions on the bump disk are inspected via the protrusion detection head to detect the positions of the standard protrusion and the reference protrusions and the standard protrusion on the bump disk is identified based on the condition that the reference protrusions are positioned either on substantially the same radial line as the standard protrusion or on a circumferential line having substantially the same radial distance as the standard protrusion and based on the predetermined positional relationship; and a circumferential speed determining step which obtains either a circumferential speed at which in accordance with the variation of the rotating speed of the spindle bumping of the protrusion detection head with the standard protrusion identified in the standard protrusion identification step occurs starting from a condition in which no bumping of the protrusion detection head with the identified standard protrusion occurs or another circumferential speed at which in accordance with the variation of the rotating speed of the spindle bumping occurrence is ceased starting from a condition in which bumping is occurring, wherein the magnetic disk is rotated either at one of the circumferential speeds determined in the circumferential speed determining step or at a circumferential speed calculated based on the determined circumferential speeds to lift the protrusion detection head.

Still further, the glide tester according to the present invention includes the protrusion detection head, the magnetic disk, the bump disk, the spindle, a standard protrusion identification means which realizes the standard protrusion identification step identifying the standard protrusion, a circumferential speed detecting means corresponding to the circumferential speed determining step and for detecting a circumferential speed, and further a protrusion inspection means in which the protrusion detection head is loaded over the magnetic disk mounted on the spindle, the spindle is rotated either at one of the determined circumferential speeds or at the calculated circumferential speed based on the determined circumferential speeds to lift the protrusion detection head, thereby a protrusion on the magnetic disk is inspected.

Now, dirt and dust usually deposit on a bump disk. The amount of deposit increases depending on the use times of the bump disk. Although it is possible to clean the surface of the bump disk, depending on the manner of cleaning, the condition of the standard protrusion can be damaged. In particular, when the floating height of a magnetic head to be used is decreased, the height of the standard protrusion is lowered correspondingly, thereby the standard protrusion can not be separated from the deposited dirt and dust.

As a result, when it is required to identify the standard protrusion without referring to the IND on the bump disk, the standard protrusion cannot be distinguished. Further, if dirt deposits near the standard protrusion the deposited dirt can be misidentified as the standard protrusion even if the IND of the bump disk is referred to. Accordingly, a reference protrusion can be provided on the bump disk as a mark referring to the standard protrusion. However, if many reference protrusions are provided near the standard protrusion, one of the reference protrusions can be misidentified as the standard protrusion. Further, if a single reference protrusion is provided, the relationship between the standard protrusion and the single reference protrusion can, with high probability, be the same as the relationship between deposited dirt and the reference protrusion. Accordingly, misidentification can not be avoided. With the provision of two reference protrusions if a single dirt bump is deposited between or around the two reference protrusions, it becomes difficult to determine the relationship between the two reference protrusions. Accordingly, with the simple provision of two reference protrusions identification reliability of the standard protrusion is still low. Moreover if the two reference protrusions are provided without rules, it takes time to find out these reference protrusions. Still further, the relationship between the two reference protrusions and the standard protrusion can also be the same as the relationship between the two reference protrusions and a deposited dirt. Therefore, a rule of setting the two reference protrusions is considered. A preferable setting rule which permits one to easily find out the reference protrusions is to locate the reference protrusions on a circumferential line having the same radial distance as the standard protrusion in view of the fact that the bump disk rotates. Further, another preferable setting rule is to locate the two reference protrusions on the same radial line as the standard protrusion in view of the fact that the protrusion detection head performs the seeking operation in the radial direction.

Through adding the above conditions, the two reference protrusions can be easily separated from a possibly deposited dirt bump and can be easily found out, moreover by further adding the positional relationship between the two reference protrusions and the standard protrusion the standard protrusion is reliably identified and can be easily determined.

In the following embodiments, in order to further enhance the reliability three or more than three reference protrusions are provided and in order to facilitate easily finding out these reference protrusions, the reference protrusions are positioned either on the same radial line as the standard protrusion or on a circumferential line having the same radial distance as the standard protrusion. However, in the present invention it is satisfactory if a plurality of reference protrusions are provided with a predetermined rule, therefore the reference protrusions are not necessarily located either on the same radial line as the standard protrusion or on a circumferential line having the same radial distance as the standard protrusion.

In the present invention, protrusions are formed on the bump disk according to the above explained sense. The protrusions are formed in the following manner, in that, other than the portions where these protrusions are formed a resist is provided, a magnetic film is applied on an aluminum substrate via an evaporation method likely when a magnetic disk is produced and then a protective film is coated thereon like the magnetic disk. Actually, only one or two acceptable acceptable bump among 100 bump disks are produced in the manner as explained above, however the acceptable one or two bump disks are very effective for performing the calibration of the floating height of the protrusion detection head. With the use of the thus produced bump disk, the specific provisions are eliminated such as the mounting mechanism which causes to register the INDs on the bump disk and the spindle and the registration detecting circuit which were necessitated when mounting the bump disk.

DESCRIPTION OF THE PREFERRED EMBODIMENTS

In FIG. 1, numeral 8 is a bump disk on which in addition to a standard protrusion Ts three reference protrusions T1, T2 and T3 are provided on a radial line connecting between the center O and the standard protrusion Ts at the inner side from the standard protrusion Ts with an equal interval. Numeral 8a is an opening provided at the center of the bump disk 8 for mounting the same onto a spindle 21. The heights $\delta h1 \sim \delta h3$ of the respective reference protrusions T1~T3 are substantially the same as the height $\delta hs$ of the standard protrusion Ts. The intervals of these reference protrusions T1~T3 are substantially the same as represented as d, however the interval distance d is smaller than the distance $d_r$ from the standard protrusion Ts to the nearest reference protrusion T1, in that $d_r > d$. With this difference the standard protrusion is easily selected. Further, by locating the standard protrusion Ts at the outerside the bumping of the protrusion detection head is limited only to the standard protrusion Ts. Alternatively, the distance $d_r$ can be made smaller than the interval distance d, in that $d_r < d$. In principle, if the distance $d_r$ is differentiated from the interval distance d, the standard protrusion Ts can be identified. However, the respective distances d and $d_r$ are required to be larger than the width of a slider in the protrusion detection head 3. Otherwise, the protrusion detection head 3 may bump simultaneously to two protrusions.

The bump disk 8 as explained above is produced in the following manner, in that aluminium or glass disk is used as a substrate, in a process prior to coating a magnetic film on the surface of the substrate a resist is formed on the surface of the substrate like a semiconductor device production process, the resist at the regions along a same radial line where the reference protrusions T1~T3 are to be formed is etched to form apertures reaching to the surface of the substrate, thereafter using the remaining resist as a mask the magnetic film is coated like the magnetic disk production process. The coating is performed until the thickness of the magnetic film reaches to the heights $\delta h1 \sim \delta h3$, after completing the coating process, resist is formed on the regions where the reference protrusions T1~T3 are formed and the resist at the region on the same radial line where the standard protrusion Ts is to be formed is etched to form an aperture reaching to the surface of the substrate, thereafter using the resist as a mask magnetic film is coated likely. The coating is performed until the thickness of the magnetic film reaches to the height $\delta hs$ and after completing this process the resist is removed. Further, the thus produced bump disk 8 is coated by a protective film. Except for the aperture formation through resist etching and the use of the resist as a mask the above explained production processes of the bump disk are substantially the same as usual magnetic disk production processes.

Of course as an alternative, the resist at the regions where the reference protrusions T1~T3 and the standard protrusion Ts are to be formed can be etched to form apertures and to thereby form these protrusions simultaneously.

Among the thus produced 100 bump disks, one or two bump disks 8 having a standard Protrusion Ts showing the height of $\delta hs$ and three reference protrusions T1~T3 respectively showing substantially the same height of $\delta hs$ are selected. The probability of producing an acceptable bump disk 8 which satisfies the above conditions is only few % of the total production.

The selection of an acceptable bump disk 8 among the thus produced 100 bump disks is, for example, performed in the following manner, using a master head of which the relationship between the circumferential speed V and the floating height already measured, the height of the standard protrusion of the respective bump disks is measured and the bump disks showing a desired height with regard to the standard protrusion are at first selected, then among the thus selected bump disk likely using the master head bump disks having the reference protrusions T1~T3 arranged along substantially the same radial line as the standard protrusion Ts and showing substantially the same height as the standard protrusion Ts are then selected.

In this instance, when one of the reference protrusions T1~T3 shows the desirable height which can be used as that for a standard protrusion, the one reference protrusion can be designated as the standard protrusion and the remainders as the reference protrusions while changing their positional order. However, it is desirable to select a protrusion located outward as much as possible for the standard protrusion in order to reduce the number of bumpings with the protrusion detection head as much as possible and to avoid the damage thereof.

Figure 2:
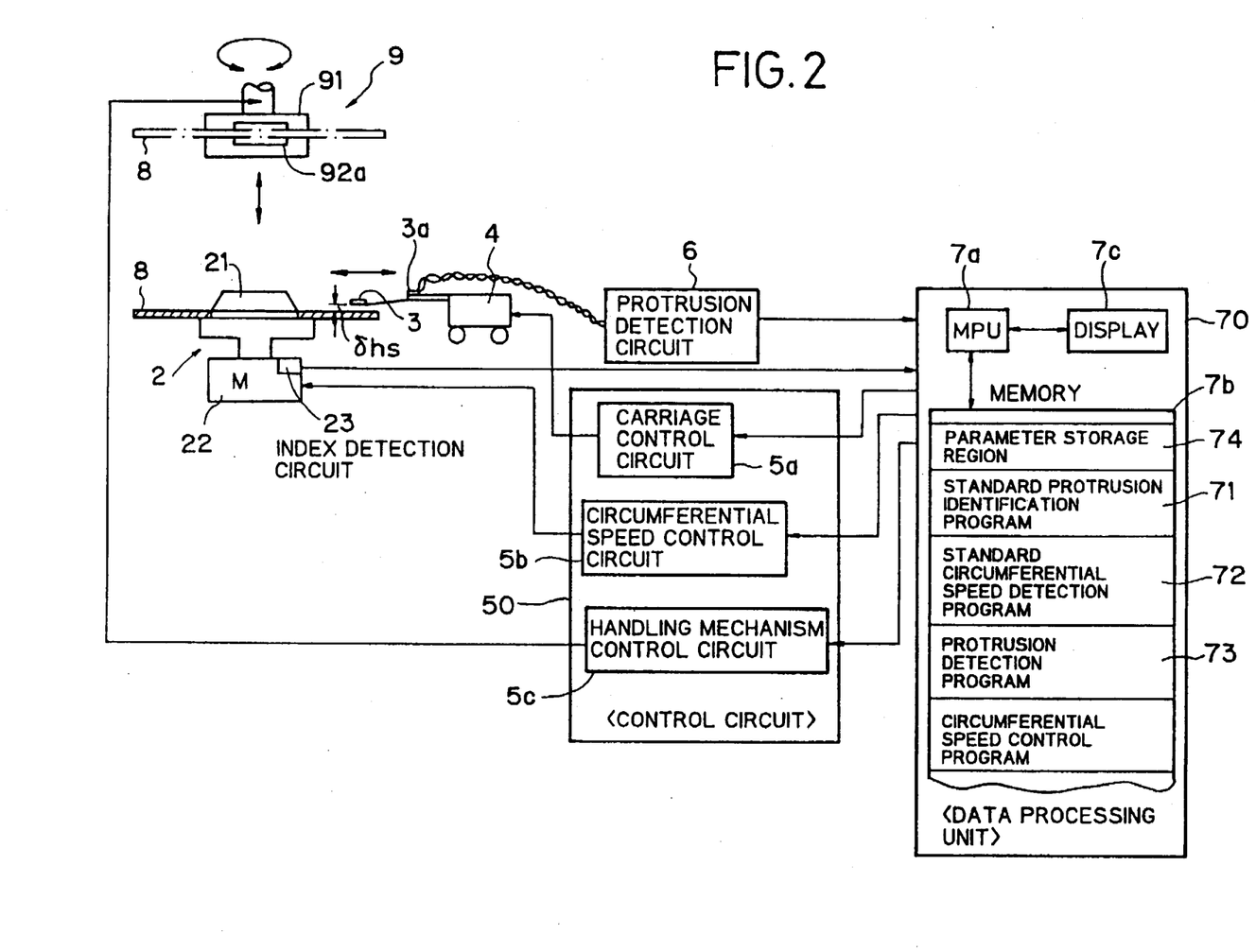
FIG. 2 is a block diagram of mainly a protrusion inspection device in a glide tester in which the calibration of the floating amount of a protrusion detection head is performed with the bump disk shown in FIG. 1.

FIG. 2 is a protrusion detection device portion in a glide tester which calibrates the floating height of the protrusion detection head by making use of the thus selected bump disk 8.

The differences from the FIG. 2 glide tester and the FIG. 7 glide tester are that the (FIG. 9) the handling mechanism 9 is provided above the spindle 21, the control circuit 5 is further provided with a handling mechanism control circuit 5c and the data processing unit 7 is replaced by a data processing unit 70 of which memory 7b is provided with a standard protrusion identification program 71 and a standard circumferential speed detection program 72. Further, in a parameter storage region 74 in the memory 7b the interval distances $d_r$ and d respectively of the standard protrusion and of the reference protrusions T1~T3 are stored. A protrusion detection program 73 and a circumferential speed control program in the memory 7b are programs used in the conventional device shown in FIG. 7.

In exchange with the magnetic disk 1 the bump disk 8 is mounted onto the spindle 21 in the rotatable mechanism 2 by means of the handling mechanism 9.

Figure 3:
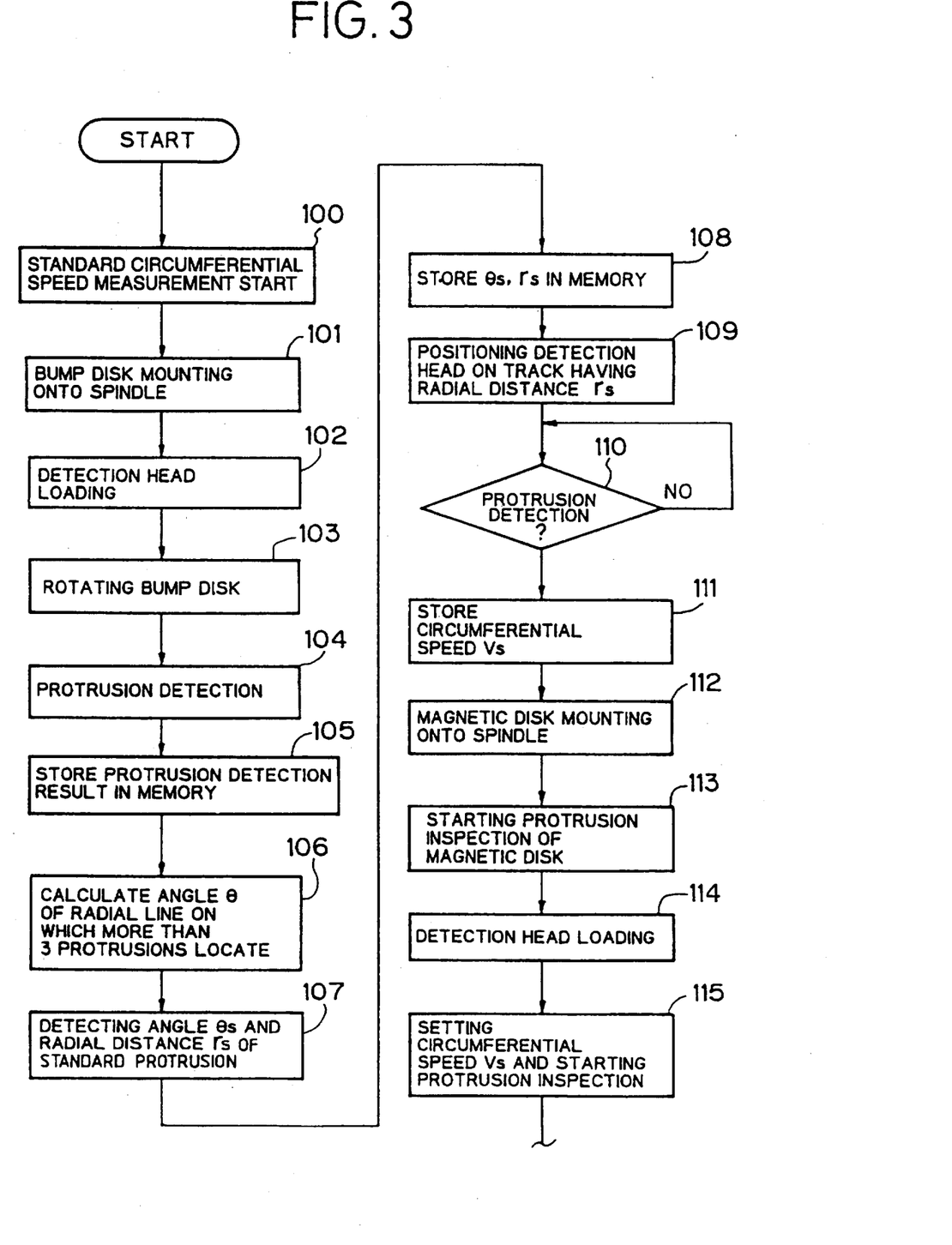
FIG. 3 is a flowchart of a standard circumferential speed measurement process for calibrating the floating height of the protrusion detection head.

A measurement process for obtaining the standard circumferential speed Vs which is used for calibrating the floating height of the protrusion detection head is explained according to the flowchart shown in FIG. 3.

At first, the measurement process for obtaining the standard circumferential speed is started via a predetermined key input (step 100). Through this step the handling mechanism 9 is actuated by the handling mechanism control circuit 5c and the bump disk 8 is mounted onto the spindle 21 (step 101). Then the protrusion detection program 73 is executed by the MPU 7a and the protrusion detection head 3 is loaded on the bump disk 8 (step 102), and the motor 22 is driven to rotate the bump disk 8 and to thereby lift the protrusion detection head 3 at a proper height (step 103). The protrusion detection is then performed over substantially the entire surface of the bump disk 8 while causing the protrusion detection head 3 to seek in the radial direction. Such protrusion detection is repeated several times over substantially the entire surface of the bump disk 8 while lowering the floating height of the protrusion detection head 3 by reducing the circumferential speed (step 104). The coordinate position rθ (represented by distance r from the center and angle θ from the index signal (IND signal)) indicating the position of a protrusion which is obtained as the result of the protrusion detection is stored in the memory 7b (step 105).

Subsequently, the standard protrusion identification program 71 is executed by the MPU 7a, and the angle θ from the IND signal position on which common radial line equal to or more than 4 protrusions are located is calculated with reference to the resultant data of the protrusion inspection stored in the memory 7b (step 106).

Among respective calculated angles θ each having four detected protrusions, a group of four protrusions which satisfies the interval distance relationship from the outside, in that $d_s$ and d is selected, the outer most protrusion is determined as the standard protrusion Ts and the distance $r_s$ from the center O and the θs from the IND signal are detected (step 107). Then these data are stored in the parameter region in the memory 7b (step 108).

Thereafter, the standard circumferential speed detection program 72 is executed by the MPU 7a and the protrusion detection head 3 is positioned on the track having distance $r_s$ from the center O (step 109), then the process enters into a monitoring process in which the circumferential speed of the bump disk 8 over this track is successively reduced from a high speed to a low speed and a protrusion detection signal which would be obtained at the position of angle θs with reference to the IND signal (step 110) is monitored. The circumferential speed Vs at the moment when the protrusion detection signal is obtained is determined as the standard circumferential speed and is stored in the parameter region in the memory 7b (step 111). The circumferential speed can be determined based on the rpm of the spindle 21 at this moment and the radius $r_s$ from the center of the bump disk 8.

Then, the bump disk 8 is removed by means of the handling mechanism 9 and the magnetic disk 1 which is the object for inspection is mounted onto the spindle 21 (step 112). The protrusion inspection of the magnetic disk 1 is started via a key input for the inspection start (step 113). In response to the key input the protrusion detection program 73 is executed by the MPU 7a and the protrusion detection head 3 is loaded on the magnetic disk 1 (step 114), the circumferential speed Vs stored in the parameter storage region 74 is read and the spindle 21 is driven to rotate the magnetic disk 1 at the circumferential speed Vs so as to perform the protrusion inspection (step 115). In the present inspection the height of the protrusion detection head 3 is already calibrated by means of the circumferential speed Vs.

FIG. 4 shows another bump disk which has a different reference protrusion arrangement from the bump disk shown in FIG. 1, wherein the reference protrusions T1 (radial distance $r_1$), T2 (radial distance $r_2$) and T3 (radial distance $r_3$) are arranged on a circumferential line having the same radial distance $r_1 \doteq r_2 \doteq r_3$ and having a smaller radial distance than the standard protrusion Ts (radial distance $r_s$). Except for the positions on the resist where the apertures are formed, the production process of the bump disk 8 shown in FIG. 4 is the same as explained above, the explanation thereof is omitted.

The reference protrusions T1, T2 and T3 are positioned with angles of about 100°, 180° and 260° with respect to the standard protrusion Ts and the respective radiuses thereof are determined in a relation of $r_1 \doteq r_2 \doteq r_3$. Further, the radius $r_s$ of the standard protrusion Ts is determined in a relation of $r_s > r_1$, $r_s > r_2$ and $r_s > r_3$. The heights δh1~δh3 of the respective reference protrusions T1~T3 are determined proximate the standard height δhs of the standard protrusion Ts. Of course, these heights δh1~δh3 are preferably lower than the standard height δhs as shown.

In this instance, the previous standard protrusion identification rule using the distances $d_s$ and d as in the step 106 is merely replaced by another standard protrusion identification rule that the reference protrusions T1, T2 and T3 lie substantially on a circumferential line having a radial distance $r_1$ ($r_1 \doteq r_2 \doteq r_3$), the standard protrusion Ts lies on a circumferential line having a radial distance $r_s$ and the angular relationships of these reference protrusions T1, T2 and T3 with respect to the standard protrusion Ts are respectively about 100°, 180° and 260°, and the other processes are substantially the same as in the previous embodiment. Accordingly, the explanation on the calibration method with the present embodiment is omitted. The specific number of reference protrusions and their angular relationships as explained above are only an example, and more than 3 reference protrusions can be provided and other angular relationships can be used. Further, in such modification, the reference protrusions T1, T2 and T3 can be arranged on substantially the same radial line.

Different from FIG. 4, in FIG. 5 the reference protrusions T1, T2 and T3 and the standard protrusion Ts are arranged on a circumferential line having the same radial distance ($r_s \doteq r_1$, $r_s \doteq r_2$, $r_s \doteq r_3$) arranged with an equal angular interval, and their heights are also substantially the same. With such configuration, any of the reference protrusions can be used as a standard protrusion. Namely, the bump disk thus configurated is equivalent to one having four standard protrusions. Correspondingly the production of such a bump disk is facilitated.

In this embodiment, the four protrusions are identified at the same time with reference to the above angular relationship and when one of the protrusions is designated as the standard protrusion the remaining protrusions serve as the reference protrusions. The identification rule of these four protrusions is that these protrusions are arranged on a circumferential line of radial distance $r_s$ ($r_s \doteq r_1 \doteq r_2 \doteq r_3$) and further arranged with substantially the same angular interval of 90° each other.

FIG. 6 is a further example of bump disks wherein a total of four reference protrusions are provided and two of them are arranged on the same radial line as the standard protrusion and the remaining two are arranged on the same circumferential line as the standard protrusion. The production method of such bump disk is substantially the same as the embodiments explained above. Namely, four reference protrusions T1~T4 are provided near and around a standard protrusion Ts, the reference protrusions T1 and T3 are located on the same radial line as the standard protrusion and at radial positions away therefrom by a distance ±δr, and the reference protrusions T2 and T4 are located on the same circumferential line as the standard protrusion and at angular positions away therefrom by an angular distance ±δθ. The heights δhp of the respective reference protrusions T1~T4 are determined lower than the standard height δhs of the standard protrusion Ts. With this bump disk in the like manner as the first embodiment as explained above, the standard protrusion Ts is identified, the standard circumferential speed VS is determined and the floating height of the protrusion detection head 3 is calibrated.

In this instance, the previous standard protrusion identification rule using the distances $d_s$ and d as explained in connection with the step 106 is replaced by still another standard protrusion identification rule that three protrusions lie on a circumferential line having radial distance $r_s$ in which both end protrusions are angularly separated by $\pm\delta\theta$ from the center protrusion each other, and further two protrusions lie on the radial line of the center protrusion at the both sides thereof by a distance $\pm\delta r$ away from the central protrusion. Still further, in this instance at first groups of three protrusions locating on a common radial line are detected, among the detected groups of three protrusions wherein the both end protrusions are separated from the center protrusion by a distance $\pm\delta r$ are selected and then among the selected groups a group wherein there exists two protrusions which are respectively separated from the central protrusion by an angular distance $\pm\delta\theta$ can be determined as a group including the standard protrusion as explained in connection with FIG. 6. Then the protrusion located in the center position in the thus determined group of protrusions is treated as the standard protrusion.

As an alternative, if reference protrusions are not provided on a circumferential line having the same radial distance as the standard protrusion, possibility of bumping the reference protrusions to the protrusion detection head is reduced, therefore the height of the reference protrusions are determined higher than that of the standard protrusion. Of course, even when the reference protrusions are provided on a circumferential line having the same radial distance as the standard protrusion, their slight height differences cause no problems, therefore the present invention is not limited to the embodiments as shown in FIGS. 5 and 6 wherein the height of the reference protrusions are selected lower than that of the standard protrusion.

Further, in the above embodiments, the standard circumferential speed Vs is determined as the circumferential speed which is obtained when the protrusion detection head first bumps to the standard protrusion starting from a condition that the protrusion detection head yet bumps no standard protrusion by lowering successively the rotating speed of the bump disk from a high speed to a low speed, however, contrary thereto the standard circumferential speed Vs can be determined as the circumferential speed which is obtained when bumpings of the protrusion detection head to the standard protrusion is ceased starting from a condition that the protrusion detection head is bumping to the standard protrusion by increasing successively the rotating speed of the bump disk from a low speed to a high speed. Still further, the standard circumferential speed Vs can be calculated as an average of the above obtained former and latter standard circumferential speeds.

I claim:

1. A calibration use disk of the floating height of a protrusion detection head comprising: a standard protrusion having a predetermined height and a plurality of reference protrusions positioned either on substantially the same radial line as said standard protrusion or on a circumferential line having substantially the same radial distance as said standard protrusion under a predetermined positional relationship with respect to said standard protrusion.

2. A calibration use disk of the floating height of a protrusion detection head according to claim 1, wherein said standard protrusion is positioned either on the radial line or on the circumferential line.

3. A calibration use disk of the floating height of a protrusion detection head according to claim 2, wherein said reference protrusions are three protrusions arranged substantially on the same radial line and at the inner side of the disk from said standard protrusion with an equal interval.

4. A calibration use disk of the floating height of a protrusion detection head according to claim 1, wherein said reference protrusions are three protrusions arranged on the circumferential line having substantially the same radial distance with a predetermined angular relationship with respect to said standard protrusion.

5. A method of calibrating the floating height of a protrusion detection head for a magnetic disk which makes use of a bump disk, comprising:

using a standard protrusion having a predetermined height and a plurality of reference protrusions positioned either on substantially the same radial line as the standard protrusion or on a circumferential line having substantially the same radial distance as the standard protrusion under a predetermined positional relationship with respect to the standard protrusion, the bump disk being mounted on a spindle on which either the bump disk or a magnetic disk is selectively mounted, further including: a standard protrusion identification step in which the protrusion detection head is loaded over the bump disk mounted on the spindle, through the rotation of the spindle the protrusion detection head is lifted, the protrusions on the bump disk are inspected via the protrusion detection head to detect positions of the standard protrusion and the reference protrusions, and the standard protrusion on the bump disk is identified based on the condition that the reference protrusions are positioned either on substantially the same radial line as the standard protrusion or on a circumferential line having substantially the same radial distance as the standard protrusion and based on the predetermined positional relationship; and a circumferential speed determining step which obtains either a circumferential speed at which in accordance with the variation of the rotating speed of the spindle bumping of the protrusion detection head with the standard protrusion identified in said standard protrusion identification step occurs starting from a condition in which no bumping of the protrusion detection head with the identified standard protrusion occurs or another circumferential speed at which in accordance with the variation of the rotating speed of the spindle bumping occurrence is ceased starting from a condition in which bumping is occurring, wherein the magnetic disk is rotated either at one of the circumferential speeds determined in the circumferential speed determining step or at a circumferential speed calculated based on the determined circumferential speeds to lift the protrusion detection head.

6. A method of calibrating the floating height of a protrusion detection head for a magnetic disk according to claim 5, wherein the standard protrusion is positioned either on the radial line or on the circumferential line.

7. A method of calibrating the floating height of a protrusion detection head for a magnetic disk according to claim 6, wherein the reference protrusions are three protrusions arranged substantially on the same radial line and at the inner side of the disk from the standard protrusion with an equal interval.

8. A method of calibrating the floating height of a protrusion detection head for a magnetic disk according to claim 5, wherein the reference protrusions are three protrusions arranged on the circumferential line having substantially the same radial distance with a predetermined angular relationship with the standard protrusion.

9. A method of calibrating the floating height of a protrusion detection head for a magnetic disk according to claim 5, wherein the plurality of reference protrusions are four protrusions, two of them are positioned substantially on the same radial line at both sides of the standard protrusion with an equal interval therewith and the other two are positioned on the circumferential line having substantially the same radial distance at both sides of the standard protrusion with an equal angular interval therewith.

10. A method of calibrating the floating height of a protrusion detection head for a magnetic disk according to claim 5, wherein the reference protrusions and the standard protrusion which are positioned on the circumferential line having substantially the same radial distance have an equal angular distance, and wherein the heights of the respective reference protrusions and the standard protrusion are substantially the same so that any one of the respective reference protrusions and the standard protrusion can be selected as the standard protrusion.

11. A glide tester, comprising: a protrusion detection head for a magnetic disk; a bump disk including a standard protrusion having a predetermined height and a plurality of reference protrusions positioned either on substantially the same radial line as the standard protrusion or on a circumferential line having substantially the same radial distance as the standard protrusion under a predetermined positional relationship with respect to the standard protrusion; a spindle on which either said bump disk or the magnetic disk is selectively mounted; a standard protrusion identification means in which said protrusion detection head is loaded over said bump disk mounted on said spindle, through the rotation of said spindle said protrusion detection head is lifted, the protrusions on said bump disk are inspected via said protrusion detection head to detect the positions of the standard protrusion and the reference protrusions, and the standard protrusion of said bump disk is identified based on the condition that the reference protrusions are positioned either on substantially the same radial line as the standard protrusion or on the circumferential line having substantially the same radial distance as the standard protrusion and based on the predetermined positional relationship; a circumferential speed determining means which obtains either a circumferential speed at which in accordance with the variation of the rotating speed of said spindle, bumping of said protrusion detection head with the standard protrusion identified in said standard protrusion identification means occurs starting from a condition in which no bumping of said protrusion detection head with the identified standard protrusion occurs or another circumferential speed at which, in accordance with the variation of the rotating speed of said spindle, bumping occurrence is ceased starting from a condition in which bumping is occurring; and a protrusion inspection means which performs a protrusion inspection by rotating the magnetic disk either at one of the circumferential speeds determined in said circumferential speed determining means or at a circumferential speed calculated based on the determined circumferential speeds and by lifting the protrusion detection head.

12. A glide tester according to claim 11, wherein the standard protrusion is positioned either on the radial line or on the circumferential line.

13. A glide tester according to claim 12, further comprising a handling mechanism which causes to selectively mount the magnetic disk or said bump disk onto said spindle.

* * * * *

UNITED STATES PATENT AND TRADEMARK OFFICE
CERTIFICATE OF CORRECTION

PATENT NO. : 5,675,462
DATED : October 7, 1997
INVENTOR(S) : S. AYABE

Figure 7A:
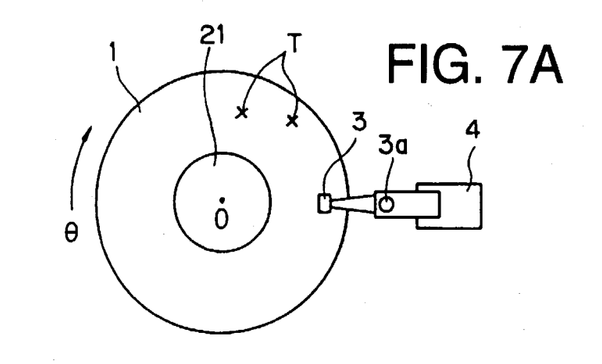
FIG. 7 is an explanatory view showing a fundamental constitution of a glide tester.
Figure 7B:
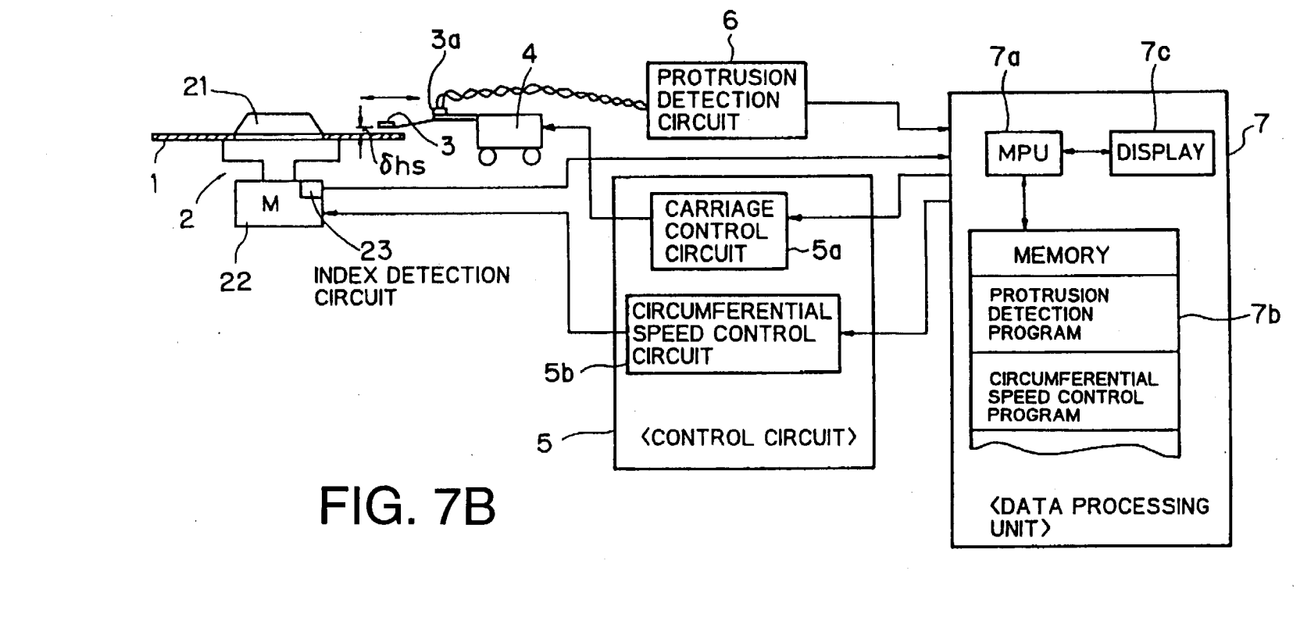

It is certified that error appears in the above-indentified patent and that said Letters Patent is hereby corrected as shown below:

Column 1, Line 66, change "Fig. 7 shows" to --Figs. 7A and 7B show--.

Figure 8A:
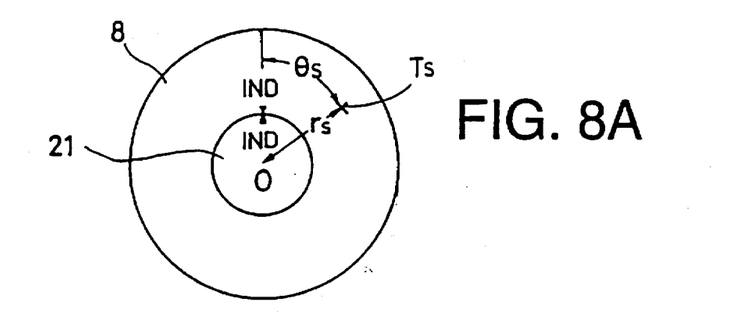
FIG. 8 is an explanatory view of an example of conventional bump disks.
Figure 8B:
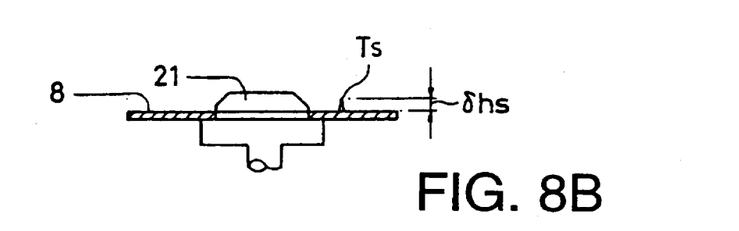

Column 2, Line 58, change "Fig. 8 shows" to --Figs. 8A and 8B show--.

Figure 9A:
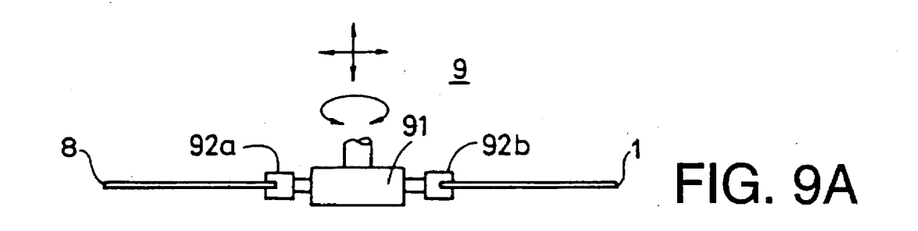
FIG. 9 is an explanatory view of a handling mechanism both for a magnetic disk and a bump disk.
Figure 9B:
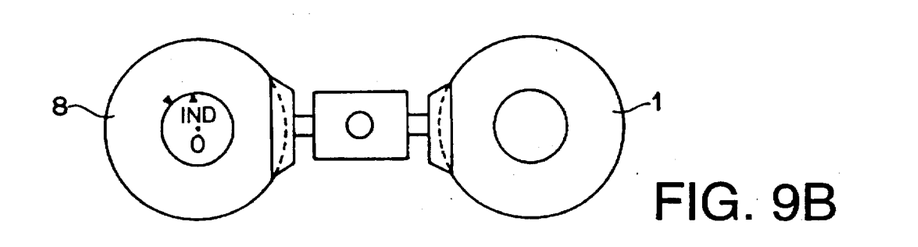
Figure 9C:
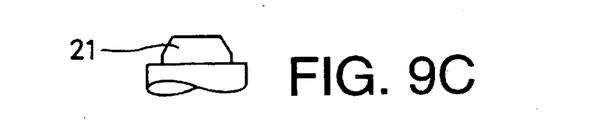

Column 3, Line 38, change "Fig. 9 is a schematic explanatory view" to --Figs. 9A to 9C are schematic explanatory views--.

Figure 1A:
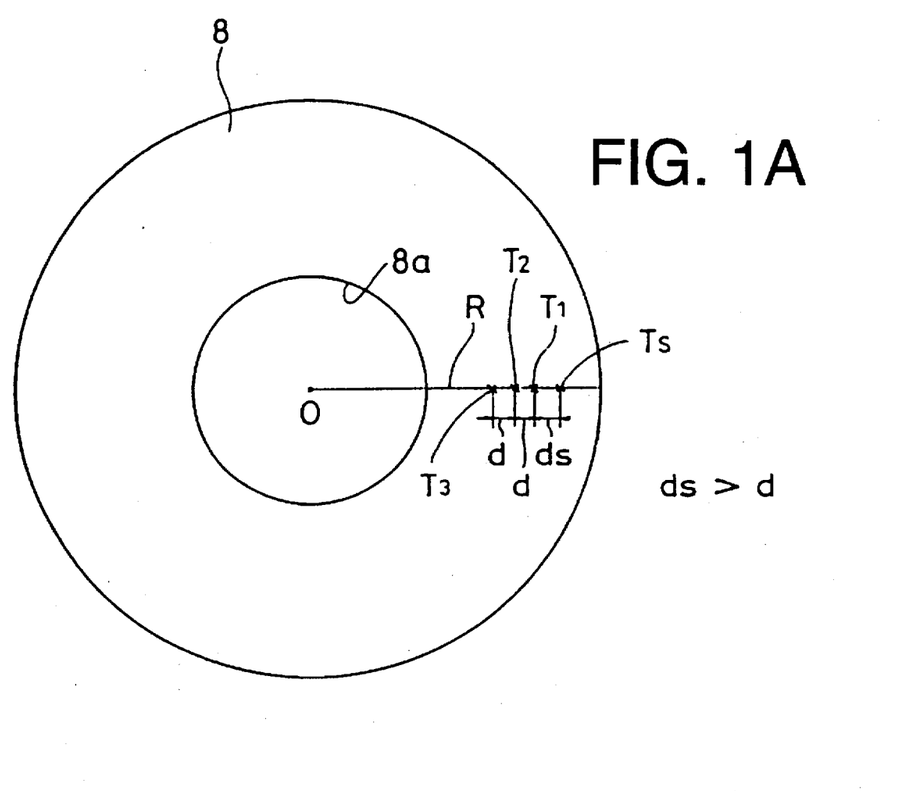
FIG. 1 is an explanatory view of one embodiment of bump disks to which the present invention is applied.
Figure 1B:
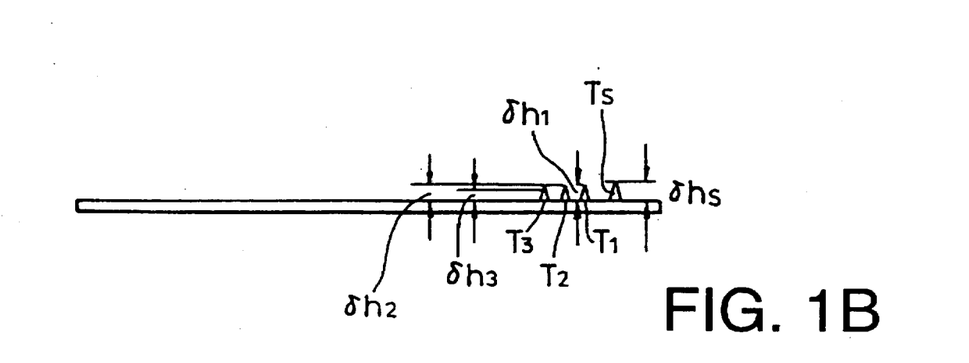
Figure 4A:
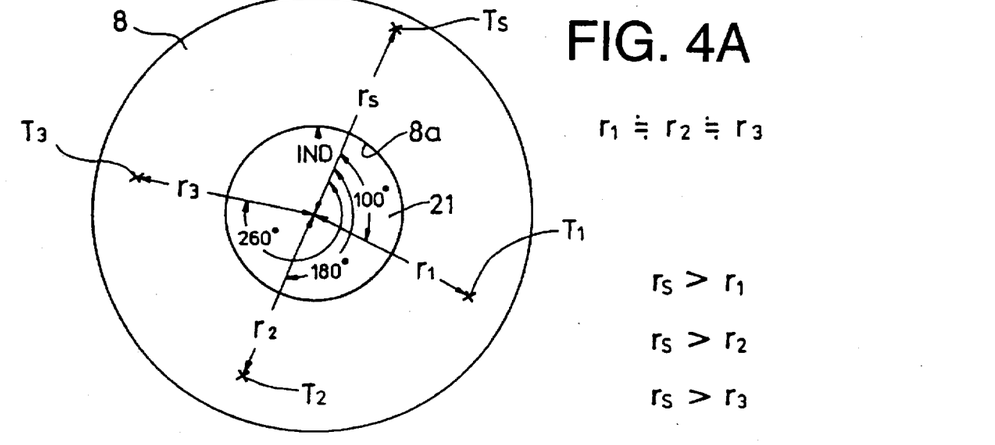
FIG. 4 is an explanatory view of another embodiment of bump disks to which the present invention is applied.
Figure 4B:
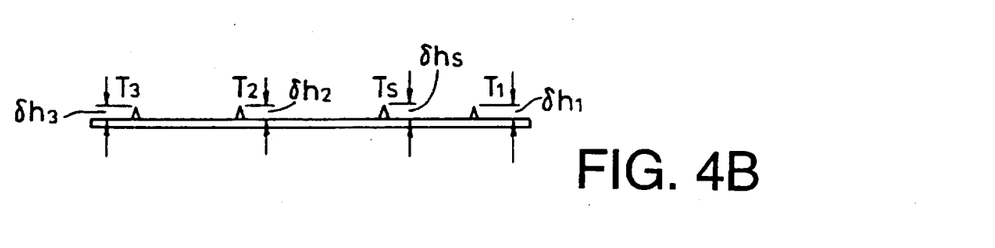
Figure 5A:
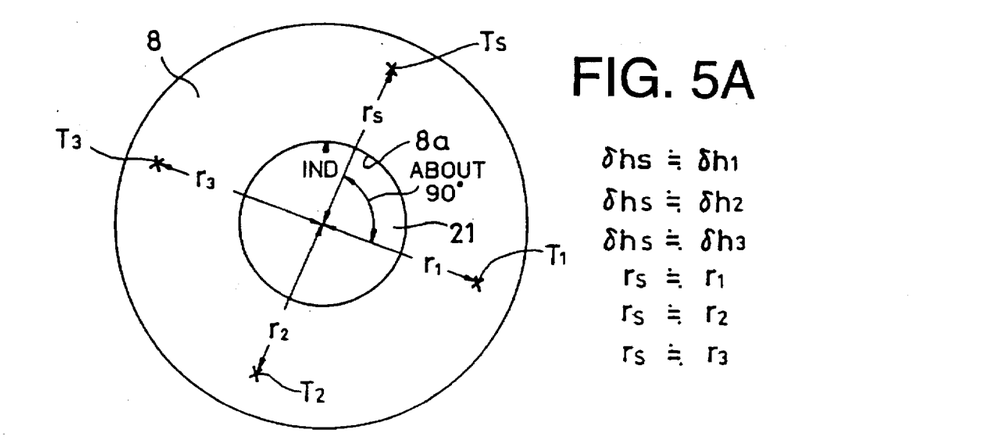
FIG. 5 is an explanatory view of still another embodiment of bump disks to which the present invention is applied.
Figure 5B:
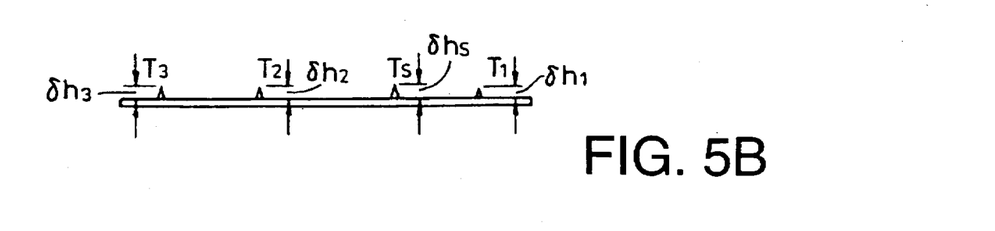
Figure 6A:
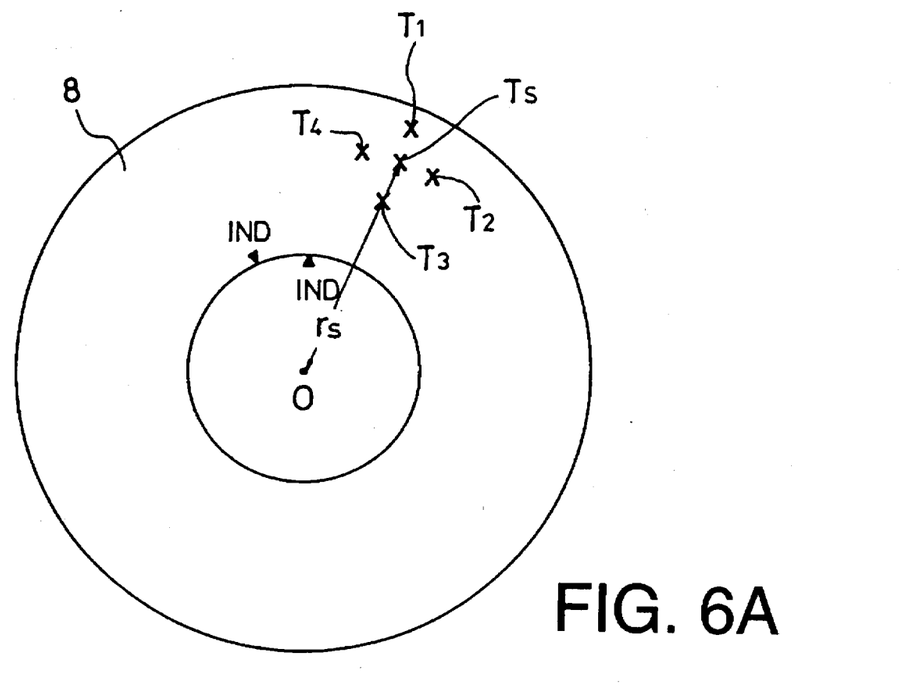
FIG. 6 is an explanatory view of a further embodiment of bump disks to which the present invention is applied.
Figure 6B:
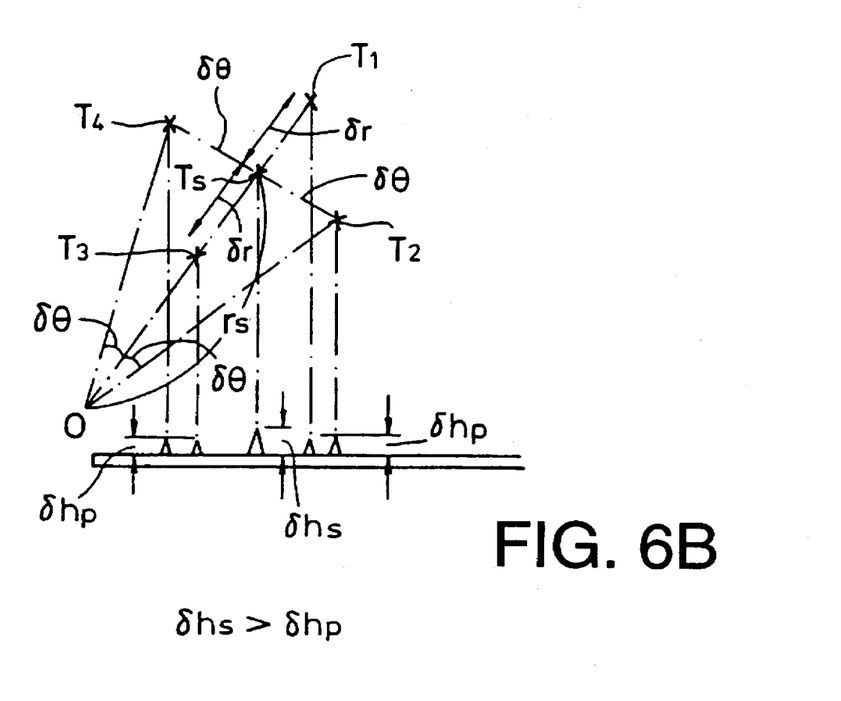

Column 6, Line 50, change "Fig. 1 is an explanatory view" to --Figs. 1A and 1B are explanatory views--;
    Line 60, change "Fig. 4 is an explanatory view" to --Figs. 4A and 4B are explanatory views--;
    Line 62, change "Fig. 5 is an explanatory view" to --Figs. 5A and 5B are explanatory views--;
    Line 64, change "Fig. 6 is an explanatory view" to --Figs. 6A and 6B are explanatory views--;
    Line 66, change "Fig. 7 is an explanatory view" to --Figs. 7A and 7B are explanatory views--.

Column 7, Line 1, change "Fig. 8 is an explanatory view" to --Figs. 8A and 8B are explanatory views--;
    Line 3, change "Fig. 9 is an explanatory view" to --Figs. 9A to 9C are explanatory views--;
    Line 9, change "Fig. 1" to --Figs. 1A and 1B--.

Column 8, Lines 32 and 33, delete these lines in their entirety and substitute therefor --The differences from the Fig. 2 glide tester and the glide tester of Figs. 7A and 7B are that the handling mechanism of Figs. 9A to 9C is provided--;
    Line 34, delete "9 is provided";
    Line 45, change "Fig. 7" to --Figs. 7A and 7B--.

UNITED STATES PATENT AND TRADEMARK OFFICE
CERTIFICATE OF CORRECTION

PATENT NO. : 5,675,462
DATED : October 7, 1997
INVENTOR(S) : S. AYABE

Page 2 of 2

It is certified that error appears in the above-indentified patent and that said Letters Patent is hereby corrected as shown below:

Column 9, Line 53, change "Fig. 4 shows" to --Figs. 4A and 4B show--;
    Line 55, change "Fig. 1" to --Figs. 1A and 1B--; and
    Line 62, change "Fig. 4" to --Figs. 4A and 4B--.

Column 10, line 26, change "Fig. 4" to --Figs. 4A and 4B--, and change "Fig. 5" to --Figs. 5A and 5B--; and
    Line 45, change "Fig. 6 is a further example of bump disks" to --Figs. 6A and 6B are further examples of a bump disk--.

Column 11, line 17, change "Fig. 6" to --Figs. 6A and 6B--;
    Line 30, change "Figs. 5 and 6" to --Figs. 5A and 5B and 6A and 6B--.

Signed and Sealed this

Seventeenth Day of March, 1998

Attest:

BRUCE LEHMAN

Attesting Officer

Commissioner of Patents and Trademarks